United States Patent [19]

Hefner, Jr.

[11] Patent Number: 4,600,760

[45] Date of Patent: * Jul. 15, 1986

[54] THERMOSETTABLE RESIN COMPOSITION CONTAINING ALKENYL PHENYL CYANATE

[75] Inventor: Robert E. Hefner, Jr., Lake Jackson, Tex.

[73] Assignee: The Dow Chemical Company, Midland, Mich.

[*] Notice: The portion of the term of this patent subsequent to Oct. 16, 2001 has been disclaimed.

[21] Appl. No.: 721,990

[22] Filed: Apr. 11, 1985

Related U.S. Application Data

[63] Continuation-in-part of Ser. No. 639,035, Aug. 9, 1984, abandoned.

[51] Int. Cl.$^4$ .................... C08F 220/52; C08L 33/24

[52] U.S. Cl. .................... 526/262; 525/185; 525/293; 526/72; 526/292.9; 526/293; 528/392

[58] Field of Search .............. 526/262, 72, 292.9, 526/293, 310, 312; 525/374, 539, 328.2, 293, 185; 528/392

[56] References Cited

U.S. PATENT DOCUMENTS 4,298,720  11/1981  Yamazaki .................... 526/262
4,477,629  10/1984  Hefner, Jr. .................... 525/113

Primary Examiner—Christopher A. Henderson
Attorney, Agent, or Firm—J. G. Carter

[57] ABSTRACT

Thermosettable compositions comprising an alkenyl phenyl cyanate and at least one of an aromatic polycyanate, a polymaleimide or a polymerizable ethylenically unsaturated aromatic monomer are disclosed.

16 Claims, No Drawings

THERMOSETTABLE RESIN COMPOSITION CONTAINING ALKENYL PHENYL CYANATE

CROSS REFERENCE TO RELATED APPLICATION

This is a continuation-in-part of application Ser. No. 639,035 filed Aug. 9, 1984, now abandoned.

BACKGROUND OF THE INVENTION

This invention relates to thermosettable resin compositions having excellent physical and mechanical properties when cured.

Aromatic polycyanates which are thermosettable to polytriazines are known, for example, from U.S. Pat. Nos. 3,448,079; 3,694,410; 3,740,348; 3,755,402 and 4,094,852. Said polytriazines possess excellent heat resistance, however, their mechanical properties, especially tensile strength and elongation are deficient. Furthermore, there is substantial room for improvement in the moisture resistance of said polytriazines.

Polymaleimides which are thermosettable are known, for example, from U.S. Pat. No. 2,444,536 and from *New Industrial Polymers*, Rudolph D. Deanin (editor), ACS Symposium Series 4 published by American Chemical Society, Washington, D.C. (1972), pages 100-123. Said polymaleimides are typically difficult to process and cure due to high melting points, poor solvent solubility and slow curing rates. The thermoset (cured) polymaleimides are very brittle and thus of limited utility.

The present invention provides novel compositions which are thermosettable to useful polymeric (cured) compositions with improved mechanical strength both as laminates and clear, unfilled castings. Many of the compositions of the present invention possess improved heat resistance and improved moisture resistance when compared to the polytriazines of the prior art. In addition, many of the compositions of the present invention possess improved processability and high reactivity. These compositions are useful in the preparation of castings, laminates, coatings and the like.

SUMMARY OF THE INVENTION

One aspect of the present invention concerns a composition which comprises
(A) at least one alkenyl phenyl cyanate containing about 10 percent by weight of the monomeric material represented by formula I and
(B) at least one of
  (1) at least one aromatic polycyanate;
  (2) at least one polymaleimide; or
  (3) at least one polymerizable ethylenically unsaturated aromatic compound;
wherein component (A) comprises from about 1 to about 99, preferably from about 1 to about 75, most preferably from about 5 to about 50 percent by weight of the combined weight of components (A) and (B) with the proviso that component (B-3) is not used alone with component (A).

The aromatic polycyanates (B-1), polymaleimides (B-2) and ethylenically unsaturated compounds (B-3) can be used in any combination and in any proportion so long as component (B-3) is not used alone with component (A).

Another aspect of the present invention concerns the product resulting from polymerizing the aforesaid composition.

DETAILED DESCRIPTION OF THE INVENTION

Suitable alkenyl phenyl cyanates which can be employed herein include, for example, those represented by the formula

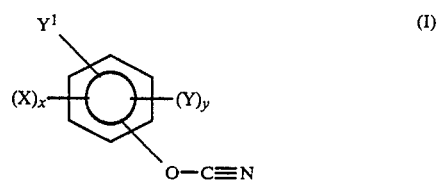

wherein each R, $R^1$ and $R^2$ is independently hydrogen or a hydrocarbyl group having from 1 to about 3 carbon atoms; each X is independently hydrogen, a hydrocarbyl group or a hydrocarbyloxy having from 1 to about 10 carbon atoms, chlorine or bromine; each Y is independently hydrogen or a hydrocarbyl group having from 1 to about 10 carbon atoms; $Y^1$ is a

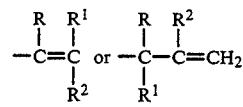

group and x and y are positive integers and the sum of x plus y has a value of 4.

The term hydrocarbyl as employed herein means any aliphatic, cycloaliphatic, aromatic, aryl substituted aliphatic or aliphatic substituted aromatic groups. Likewise, the term hydrocarbyloxy group means a hydrocarbyl group having an oxygen linkage between it and the object to which it is attached.

These materials are conveniently prepared by reacting a stoichiometric quantity or a slight stoichiometric excess (up to about 20 percent excess) of a cyanogen halide with an alkenyl phenol in the presence of a stoichiometric quantity of a base material. Suitable alkenyl phenols include those represented by the formula

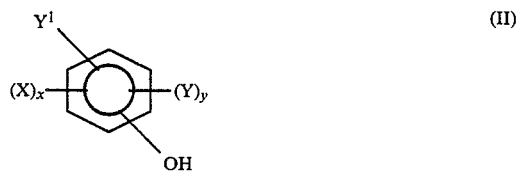

wherein R, $R^1$, $R^2$, X, Y, $Y^1$, x and y are as hereinbefore defined. Suitable cyanogen halides include cyanogen bromide and cyanogen chloride. Alternately, the method of Martin and Bauer described in Organic Synthesis, Volume 61, pp. 35-68 (1983) and published by John Wiley and Sons can be used to generate the required cyanogen halide in situ from sodium cyanide and a halogen such as chlorine or bromine.

Suitable alkenyl phenyl cyanates represented by formula I include, for example, p-isopropenylphenyl cyanate, p-vinylphenyl cyanate, m-vinylphenyl cyanate, methyl-p-isopropenylphenyl cyanate, 3-chloro-4-isopropenylphenyl cyanate, p-allylphenyl cyanate, p- methallylphenyl cyanate, m-allylphenyl cyanate, 2,6-dimethyl-4-allylphenyl cyanate, mixtures thereof and the like. It is most preferred that the alkenyl phenyl cyanate be substantially free of dimeric and/or oligomeric components although it is operable to use an alkenyl phenyl cyanate containing substantial (up to 90 pbw) dimeric and/or oligomeric components. Said components are formed during the cyanation reaction of an alkenyl phenol (II) containing the corresponding dimeric diphenols and/or oligomeric polyphenols.

Suitable bases include both inorganic bases and tertiary amines such as sodium hydroxide, potassium hydroxide, triethylamine, mixtures thereof and the like. Most preferred as the base is triethylamine.

Suitable solvents include water, acetone, chlorinated hydrocarbons, ketones and the like. Most preferred solvents are acetone and methylene chloride. Reaction temperatures of from about −40° to about 60° C. are operable with temperatures of −20° to 25° C. being preferred.

Suitable aromatic polycyanates which can be employed herein include, for example, those represented by the formulas

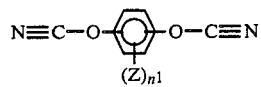
(IIIA)

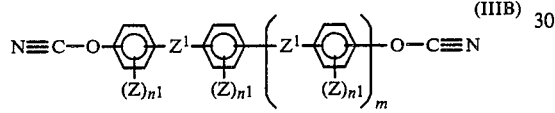
(IIIB)

(IIIC)

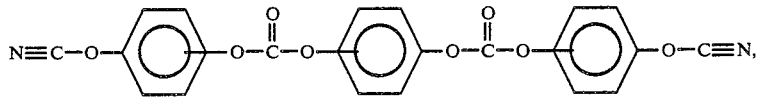

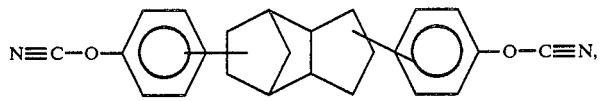

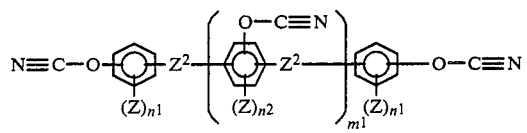

(IIID)

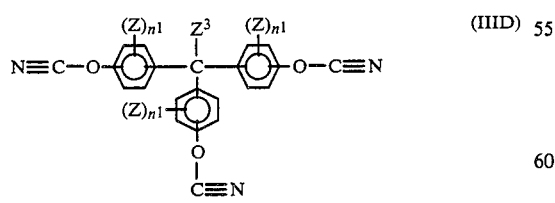

wherein each Z is independently hydrogen, a hydrocarbyl or hydrocarbyloxy group having from 1 to about 10 carbon atoms, chlorine, bromine, or a —O—C≡N group; $Z^1$ is independently a direct bond, an alkylene group having from 1 to about 5 carbon atoms, —S—, —S—S—, —O—,

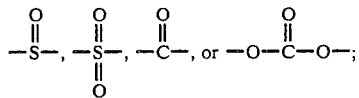

$Z^2$ is independently a divalent hydrocarbon group having from 1 to about 6, preferably from 1 to about 4 carbon atoms or a

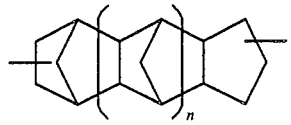

group; $Z^3$ is a hydrogen, a hydrocarbyl or hydrocarbyloxy group having from 1 to about 10 carbon atoms, chlorine or bromine; m has a value of zero to about 100, preferably from zero to about 10, $m^1$ has a value of from about 0.001 to about 6, preferably from about 0.01 to about 3; n has a value of from zero to about 10, preferably from zero to 3; $n^1$ has a value of 4 and $n^2$ has a value of 3.

Suitable aromatic polycyanates represented by formulas IIIA, IIIB, IIIC and IIID include, for example, bisphenol A dicyanate, the dicyanates of 4,4'-dihydroxydiphenyl oxide, resorcinol, 4,4'-thiodiphenol, 4,4'-sulfonyldiphenol, 3,3',5,5'-tetrabromobisphenol A, 2,2',6,6'-tetrabromobisphenol A, 3-phenyl bisphenol A, 4,4'-dihydroxybiphenyl, 2,2'-dihydroxybiphenyl, 2,2', 4,4'-tetrahydroxydiphenyl methane, 2,2', 6,6'-tetramethyl-3,3',5,5'-tetrabromobisphenol A, 3,3'-dimethoxybisphenol A, the tricyanate of tris(hydroxyphenyl)methane, the polycyanate of a phenolformaldehyde condensation product (novolac), the polycyanate of a dicyclopentadiene and phenol condensation product, and the like. The aromatic polycyanates may be used either alone or in any combination.

The aromatic polycyanates optionally employed herein which are represented by formulas IIIA, IIIB, IIIC and IIID are prepared by reaction of stoichiometric quantity or slight stoichiometric excess (up to about 20 percent) of a cyanogen halide and stoichiometric base per hydroxyl group with an aromatic polyphenol represented by formulas

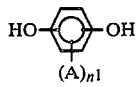
(IVA)

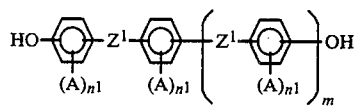 (IVB)

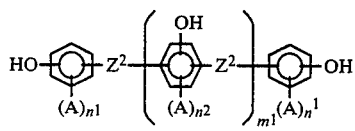 (IVC)

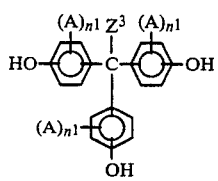 (IVD)

where $Z^1$, $Z^2$, $Z^3$, $n^1$, $n^2$, m and $m^1$ are as hereinbefore defined, and A is independently hydrogen, a hydrocarbyl or hydrocarbyloxy group having from 1 to about 10 carbon atoms, chlorine, bromine, or a hydroxyl group.

Suitable cyanogen halides include cyanogen bromide and cyanogen chloride. Alternately, the method of Martin and Bauer described in Organic Synthesis, Volume 61, pp. 35–68 (1983) and published by John Wiley and Sons can be used to generate the required cyanogen halide in situ from sodium cyanide and a halogen such as chlorine or bromide.

Suitable bases include both inorganic bases and tertiary amines such as sodium hydroxide, potassium hydroxide, triethylamine, mixtures thereof and the like. Most preferred as the base is triethylamine.

Suitable solvents include water, acetone, chlorinated hydrocarbons, ketones, and the like. Most preferred solvents are acetone and methylene chloride. Reaction temperatures of from about −40° to about 60° C. are operable with temperatures of −20° to 25° C. being preferred.

Suitable polymaleimides which can be employed herein include, for example, those represented by the formulas

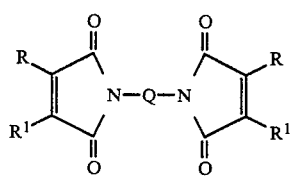

(V)

(VI)

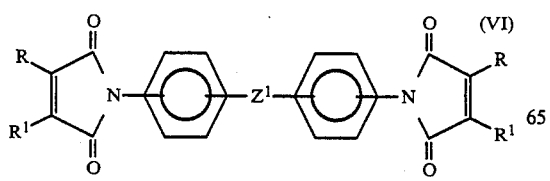

(VII)

wherein R, $R^1$ and $Z^1$ are as hereinbefore defined; Q is a divalent alkyl radical having 2 to about 12 carbon atoms and $m^1$ has a value of 0.01 to about 10.

Typical polymaleimides represented by formulas V, VI, and VII include, N,N'-ethylenebismaleimide, N,N'-ethylenebis(2-methylmaleimide), N,N'-hexamethylenemaleimide, N,N'-(oxydi-p-phenylene)bismaleimide, N,N'-(methylenedi-p-phenylene)bismaleimide, N,N'-(methylenedi-p-phenylene)bis(2-methylmaleimide), N,N'-(thiodi-p-phenylene)bismaleimide, N,N'-(sulfonyldi-m-phenylene)-bismaleimide, N,N'-(isopropylidenedi-p-phenylene)bismaleimide, polymethylene polyphenylene polymaleimides and the like. The polymaleimides may be used either alone or in any combination.

The polymaleimides can be prepared by reacting a stoichiometric quantity of a maleic anhydride per amine group of a polyamine in the presence of a suitable solvent.

Suitable maleic anhydrides include, for example, those represented by the formula (VIII)

wherein R and $R^1$ are as hereinbefore defined.

Suitable maleic anhydrides include maleic anhydride, methyl maleic anhydride, mixtures thereof and the like. Most preferred as the maleic anhydride is maleic anhydride, per se.

Suitable polyamines which can be employed to prepare the polymaleimides include, for example, those represented by the formulas $H_2N-Q-NH_2$ (IX)

(X)

(XI)

wherein Q, $Z^1$ and $m^1$ are as hereinbefore defined.

Suitable polyamines include 1,4-diaminobutane, dodecyl diamine, 1,6-hexane diamine, 2-methyl-4-ethyl-1,8-diaminooctane, methylene dianiline, diaminodiphenyl ether, aniline-formaldehyde condensation products, mixtures thereof and the like.

Suitable solvents include aromatic hydrocarbons, chlorinated hydrocarbons, N,N-dimethylformamide and the like. Most preferred solvents are N,N-dimethylformamide, chloroform and toluene. The polymaleamic acid resulting from reaction of a maleic anhydride and a polyamine may be isolated then dehydrated to the desired polymaleimide. Alternately, the reaction may be performed in a single continuous step. Detailed procedure for preparing polymaleimides can be found in U.S. Pat. Nos. 2,462,835 and 2,444,536.

Suitable polymerizable ethylenically unsaturated aromatic materials which can be employed herein include those represented by the formula

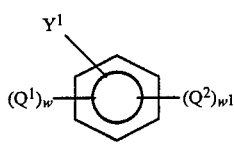 (XII)

wherein R, $R^1$, $R^2$ and $Y^1$ are as previously defined, each $Q^1$ is independently hydrogen, a hydrocarbyl group or hydrocarbyloxy group having from 1 to about 10 carbon atoms, a vinyl group, an allyl group, chlorine or bromine; each $Q^2$ is independently hydrogen or a hydrocarbyl or hydrocarbyloxy group having from 1 to about 4 carbon atoms and w and $w^1$ are each positive integers, the sum of which is 5.

Typically ethylenically unsaturated compounds represented by formula XII include, for example, styrene, alpha-methylstyrene, chlorostyrene, bromostyrene, t-butylstyrene, p-methylstyrene, p-methoxystyrene, divinylbenzene, propylstyrene, chloro-alpha-methylstyrene, m-methylstyrene, o-methylstyrene, allylbenzene, methallylbenzene, p-allylbenzene, diallylbenzene, mixtures thereof and the like.

The aforementioned compositions can be cured by heating from about 50° C. to about 350° C. or more, preferably by heating at from about 70° C. to about 200° C. in the presence of a suitable trimerization catalyst and, optionally, in the presence of a suitable free radical forming catalyst.

Suitable trimerization catalysts include, for example, those disclosed in U.S. Pat. Nos. 3,694,410 and 4,094,852. Most preferred trimerization catalysts are cobalt naphthenate, cobalt octoate and the like. The quantity depends upon the particular trimerization catalyst, cure temperature and polymerizable monomers employed but usually from about 0.001 to about 5 percent by weight is adequate.

Suitable free radical forming catalysts include the organic peroxides and azo or diazo compounds. Particularly suitable are t-butyl perbenzoate, azobisisobutyronitrile, dicumylperoxide, di-t-butylperoxide and the like. The quantity depends upon the particular catalyst, cure temperature and the particular monomers employed, but usually from about 0.001 to about 2 percent by weight is suitable.

Prepolymerization or B-staging of the compositions can be accomplished by using lower temperatures and/or shorter curing times. Curing of the thus formed prepolymerized or B-staged resin can then be completed at a later time or immediately following prepolymerization or B-staging by increasing the temperature and/or curing time.

The cured (copolymerized) products possess a complex variety of curing structures which depend, in part, upon the amounts and types of alkenylphenyl cyanate (I), optionally an aromatic polycyanate (IIIA, IIIB, IIIC and IIID), optionally a polymaleimide (V, VI and VII) and optionally a polymerizable ethylenically unsaturated compound (XII).

Compositions which contain polymerizable ethylenically unsaturated groups (formulas I, V, VI, VII and XII) homo and copolymerize to produce crosslinked curing structures. Homo and copolymerization is also meant to include both dimerization and oligomerization.

A specific example is the curing structure derived from vinyl copolymerization of p-isopropenylphenyl cyanate (formula I where X is —H, Y is —H, x+y is 4, $Y^1$ is

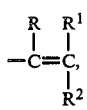

R is —CH$_3$, $R^1$ is —H, $R^2$ is —H) and the bismaleimide of 4,4'-diaminodiphenyl methane (formula VI where $Z^1$ is —CH$_2$—, R is H, $R^1$ is H):

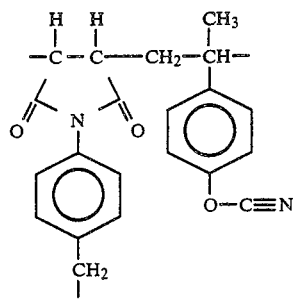

Compositions which contain cyanate groups (formulas I, IIIA, IIIB, IIIC and IIID) homo and copolymerize to produce triazine curing structures.

A specific example is the triazine curing structure derived from cyclotrimerization of p-isopropenylphenyl cyanate (formula I where X is —H, Y is —H, x+y is 4, $Y^1$ is

R is —CH$_3$, $R^1$ is —H, $R^2$ is —H) and the dicyanate of bisphenol A (formula IIIB where $Z^1$ is

Z is —H, m is 0, $n^1$ is 4):

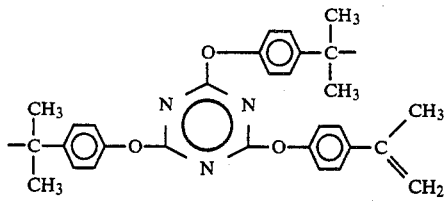

Compositions which contain polymerizable ethylenically unsaturated groups (formulas I, V, VI, VII and XII) and compositions which contain the cyanate group (formulas I, IIIA, IIIB, IIIC and IIID) copolymerize to produce curing structures. Numerous combinations of these curing structures are possible. For example, copolymerization of p-isopropenylphenyl cyanate (formula I where X is —H, Y is —H, x+y is 4, Y¹ is

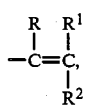

R is —CH$_3$, R¹ is —H, R² is —H) and the bismaleimide of 4,4'-diaminodiphenylmethane (formula VI where Z¹ is —CH$_2$—, R is —H, R¹ is —H) and the dicyanate of bisphenol A (formula IIIB where Z¹ is

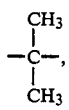

Z is —H, m is 0, n¹ is 4) provides the following as one of the curing structure possibilities:

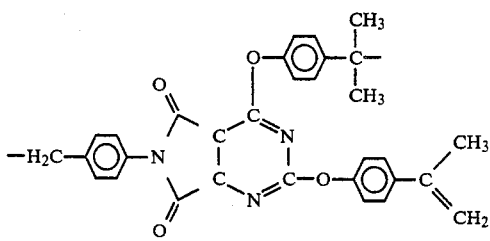

As a second example, copolymerization of p-isopropenylphenyl cyanate (formula I where X is —H, Y is —H, x+y is 4, Y¹ is

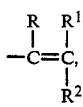

R is —CH$_3$, R¹ is —H, R² is —H), bisphenol A dicyanate (formula IIIB where Z¹ is

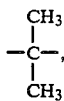

Z is —H, m is 0, n¹ is 4) and styrene (formula XII where Q¹ is —H, Q² is —H, w+w¹ is 5, Y¹ is

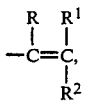

R is —H, R¹ is —H, R² is —H) provides the following as one of the curing structure possibilities:

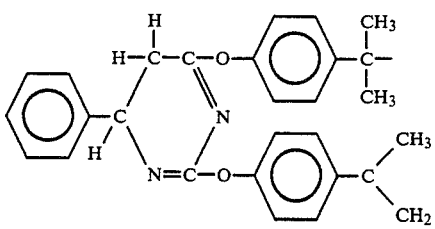

The amounts and types of curing structures present in the copolymerized (cured) products of the present invention can additionally be influenced by the presence or absence of a trimerization catalyst as well as its specific composition, the presence or absence of a free-radical forming catalyst as well as its specific composition, the cure time, the cure temperature and other variables.

Compositions which comprise an alkenylphenyl cyanate (I) and at least one of an aromatic polycyanate (IIIA and/or B and/or C and/or D), a polymaleimide (V and/or VI and/or VII) and/or an ethylenically unsaturated compound (XII) can be cured (polymerized) either simultaneously or in stages. As a specific example, copolymerization of 4 moles of p-isopropenylphenyl cyanate and 1 mole of bisphenol A dicyanate in the presence of a suitable trimerization catalyst can be performed under reaction conditions which lead to a degree of conversion which does not preclude dissolution in styrene. Said composition is then dissolved in styrene and copolymerized therewith. Alternately, p-isopropenylphenyl cyanate, bisphenol A dicyanate and styrene are combined then simultaneously copolymerized.

In those instances where X is chlorine or bromine (formula I), Z is chlorine or bromine (formula III) and/or Q¹ is chlorine or bromine (formula XII) the halogen(s) are incorporated into the copolymers by the polymerization of monomer(s) containing said group(s). Furthermore, the halogen groups can be incorporated into the copolymers in a specific location within the polymer structure. As a specific example, copolymerization of p-isopropenylphenyl cyanate, bisphenol A dicyanate and chlorostyrene provide a copolymer wherein Q¹ is chlorine and Q¹ is specifically present only on the styrene aromatic rings within the polymer chains. Said products, where X is chlorine or bromine (formula I), Z is chlorine or bromine (formula III) and/or Q¹ is chlorine or bromine (formula XII), are useful as fire retardant polymers.

If desired, the compositions of the present invention can also contain, pigments, fillers, dyes, shrinkage control additives, modifiers and the like.

The compositions of the present invention are useful in the preparation of castings, structural or electrical laminates, coatings, composites and the like.

Laminates or composites can be prepared from the compositions of the present invention employing any facing and/or reinforcing materials such as, for example, metallic sheets, woven or mat materials, such as fiberglass, graphite, asbestos, aramids, carbon, combinations thereof and the like.

The following examples are illustrative of the invention but are not to be construed as to limiting the scope thereof in any manner.

EXAMPLE 1

A. Preparation of p-Isopropenylphenyl Cyanate

A 134.17 gram portion of p-isopropenyl phenol (1.00 mole), 111.23 grams of cyanogen bromide (1.05 mole) and 600 milliliters of acetone were added to a reactor and maintained under a nitrogen atmosphere with stirring. The p-isopropenyl phenol used herein was of in excess of 99 percent purity. The stirred solution was cooled to −10° C. then 101.19 grams of triethylamine (1.00 mole) was to the reactor over a twenty minute (1200 s) period and so as to maintain the reaction temperature of −5° to −2° C. After completion of the triethylamine addition, the reactor was maintained at −2° to 5° C. for an additional thirty minutes (1800 s), followed by addition of the reactor contents to 1 gallon of chilled deionized water. After five minutes (300 s) the water and product mixture was multiply extracted with three 400 milliliter volumes of methylene chloride. The combined methylene chloride extract was washed with 500 milliliters of 5 percent aqueous hydrochloric acid followed by washing with 800 milliliters of deionized water then drying over anhydrous sodium sulfate. The dry methylene chloride extract was filtered and solvent removed by rotary evaporation under vacuum. p-Isopropenylphenyl cyanate (132.5 grams) was recovered in 83.2 percent yield as a transparent light amber colored liquid. Infrared spectrophotometric analysis of a film sample of the product confirmed the product structure (disappearance of phenolic hydroxyl group, appearance of —C≡N group). Gas chromatographic-mass spectroscopic analysis of the product confirmed the structure for p-isopropenylphenyl cyanate (parent ion m/e=159) with essentially no other compounds being present.

B. Preparation of Bisphenol A Dicyanate

A 342.5 gram portion of 4,4'-isopropylidenediphenol (1.50 moles), 333.68 grams of cyanogen bromide (3.15 moles) and 1000 milliliters of acetone were added to a reactor and maintained under a nitrogen atmosphere with stirring. The stirred solution was cooled to −5° C. then 305.09 grams of triethylamine (3.015 moles) was added to the reactor over a twenty-four minute (1440 s) period and so as to maintain the reaction temperature at −5° to 0° C. After completion of the triethylamine addition, the reactor was maintained at 0° to 7° C. for an additional forty-five minutes (2700 s), followed by addition of the reactor contents to 1 gallon of chilled deionized water. After twenty minutes (1200 s) the water and product mixture was filtered and the recovered crude crystalline product was dissolved in 1000 milliliters of methylene chloride. The methylene chloride solution was washed with 500 milliliters of 5 percent aqueous hydrochloric acid followed by washing with 500 milliliters of deionized water then drying over anhydrous sodium sulfate. The dry methylene chloride solution was filtered and solvent removed by rotary evaporation under vacuum. Bisphenol A dicyanate (370.3 grams) was recovered in 88.7 percent yield as a white crystalline solid. Infrared spectrophotometric analysis of a film sample of the product confirmed the product structure (disappearance of phenolic hydroxyl group, appearance of —C≡N group).

C. Preparation and Copolymerization of p-Isopropenylphenyl Cyanate, Bisphenol A Dicyanate and Styrene Solution A 13.75 gram portion of p-isopropenylphenyl cyanate, 206.25 grams of bisphenol A dicyanate, 55.00 grams of styrene and 0.138 gram of cobalt naphthenate (6.0 percent active) were combined to form a solution. This solution was poured into a ⅛ inch (0.3175 cm) mold made from a pair of glass plates and then placed in an oven and maintained at 120° C. for 12 hours (43,200 s), 150° C. for 4 hours (14,400 s), then 177° C. for 2 hours (7,200 s). The transparent, amber colored, clear unfilled casting was demolded and used to prepare test pieces for heat distortion temperature (264 psi, 1820 kPa), tensile and flexural strength, flexural modulus, percent elongation, and average Barcol hardness (934–1 scale) determinations. Mechanical properties of tensile (8) and flexural (5) test pieces were determined using an Instron machine with standard test methods (ASTM D-638 and D-790). Heat distortion temperature of clear casting test pieces (2) was determined using an Aminco Plastic Deflection Tester (American Instrument Co.) with standard test methods (ASTM D-648 modified). The results are reported in Table I.

TABLE I

| | |
|---|---|
| Barcol Hardness | 28 |
| Heat Distortion Temperature, °F./°C. | 188.2/86.8 |
| Tensile Strength, psi/kPa | 10,216/70,437 |
| Elongation % | 3.28 |
| Flexural Strength, psi/kPa | 15,190/104,732 |
| Flexural Modulus, psi/kPa | 552,506/3,809,418 |

EXAMPLE 2

Preparation and Copolymerization of p-Isopropenylphenyl Cyanate, Bisphenol A Dicyanate and Styrene Solution A 13.75 gram portion of p-isopropenyl cyanate from Example 1A, 123.75 grams of bisphenol A dicyanate from Example 1B, 137.5 grams of styrene and 0.138 gram of cobalt naphthenate (6.0 percent active) were combined to form a solution. This solution was poured into a ⅛ inch (0.3175 cm) mold and then placed in an oven and maintained at 120° C. for 12 hours (43,200 s), 130° C. for 8 hours (28,800 s), 140° C. for 15 hours (54,000 s) then 177° C. for 2 hours (7,200 s). The transparent, light amber colored, clear unfilled casting was demolded and used to prepare test pieces which were tested using the method of Example 1C. The results are reported in Table II.

TABLE II

| | |
|---|---|
| Barcol Hardness | 31 |
| Heat Distortion Temperature,°F.°C. | 196.3/91.3 |
| Tensile Strength, psi/kPa | 9199/63,425 |
| Elongation % | 3.08 |
| Flexural Strength, psi/kPa | 1,445/92,701 |
| Flexural Modulus, psi/kPa | 536,125/3,696,475 |

EXAMPLE 3

A. Preparation of Bismaleimide of Methylenedianiline

A 106.0 gram portion of maleic anhydride (1.08 moles) and 400 milliliters of N,N-dimethylformamide were added to a reactor and maintained under a nitrogen atmosphere with stirring. The stirred solution was cooled to 5° C. then 107.0 grams of methylenedianiline (0.54 mole) dissolved in 200 milliliters of N,N-dimethylformamide was added to the reactor over a sixty minute (3600 s) period and so as to maintain the reaction temperature at 5° to 10° C. After completion of the methylenedianiline in N,N-dimethylformamide solution addition the reactor was maintained at 5° to 10° C. for an additional 120 minutes (7200 s). The reactor was then allowed to warm to room temperature (25° C.), and the reaction product was removed and rotary evaporated at 55° to 60° C. under vacuum. After approximately 300 milliliters of N,N-dimethylformamide and water had distilled off, a voluminous light yellow colored precipitate formed and was recovered by filtration. The recovered precipitate was recrystallized from acetone and then dried in a vacuum oven at 80° C. The bismaleimide of methylenedianiline (172.6 grams) was recovered in 89.2 percent yield as a light yellow colored powder. Infrared spectrophotometric analysis of a potassium chloride pellet of the product confirmed the product structure. Nuclear magnetic resonance spectroscopy provided further confirmation of the product structure.

B. Preparation and B-Staging of a Bisphenol A Dicyanate, Bismaleimide of Methylene Dianiline and p-Isopropenylphenyl Cyanate Solution A 10.0 gram portion of the bismaleimide of methylenedianiline from A above and 220.0 grams of bisphenol A dicyanate prepared using the method of Example 1B were combined to form a mixture. This mixture was heated to 150° C. and stirred for 10 minutes (600 s) to provide an amber colored solution. This solution was cooled to 75° C. then 20.0 grams of p-isopropenylphenyl cyanate from Example 1A and 0.125 gram of cobalt naphthenate (6.0 percent active) were added. The resulting solution possessed a Brookfield viscosity of 50 cp at 75° C. B-staging (prepolymerization) of the solution was accomplished by heating at 120° C. for 2.5 hours (9000 s). The resulting B-staged product possessed a Brookfield viscosity of greater than 1000 cp at 120° C. and was recovered as a transparent, amber colored solid at room temperature (25° C.).

C. use of B-Staged Bisphenol A Dicyanate, Bismaleimide of Methylenedianiline and p-Isopropenylphenyl Cyanate Resin in Preparation of a Cured Glass Laminate A 55.0 gram portion of the B-staged bisphenol A dicyanate, bismaleimide of methylenedianiline and p-isopropenylphenyl cyanate resin from B above and 150 grams of methylene chloride were combined to form a solution. This solution was filtered and then 0.028 gram of cobalt naphthenate (6.0 percent active) was added. A set of three 12 inch by 12 inch (304.8 mm by 304.8 mm) woven fiberglass cloth pieces were then equally impregnated with the solution. The fiberglass cloth used was a commercial-grade product treated with a proprietary coupling agent (Burlington 76-28 electrical laminating cloth) and had an average weight of 0.14 gram per square inch (0.0217 g/cm²). The set of impregnated cloths were allowed to dry for 1 hour (3600 s) at room temperature (25° C.) followed by additional drying in a vented, forced-air, convection-type oven for 30 minutes (1800 s) at 75° C. Each cloth was cooled and found to be tack-free at room temperature and then cut to provide ten 6 inch by 6 inch (152.4 mm by 152.4 mm) pieces which were loaded into a stainless steel frame and placed between stainless steel plates which had been treated with a silicone mold release. The plates were loaded into a 200° C. hot press (Pasadena Hydraulics, Inc., Model P-215) and maintained for two hours (7200 s) at 5000 psi (34.5 MPa). After this time a 6 inch by 6 inch by 1/16 inch (152.4 mm by 152.4 mm by 1.5785 mm) amber colored, rigid laminate was recovered and cut to provide a set of six 1 inch by 2 inch by 1/16 inch (25.4 mm × 50.8 mm by 1.5875 mm) flexural strength test pieces. The flexural strength test pieces were post-cured at 200° C. for two hours (7200 s) and then tested on an Instron machine with standard methods (ASTM D-790). The Instron machine was set at a 1 inch (25.4 mm) span, 0.02 inch per minute (0.0085 mm/s) crosshead speed and a 0.5 inch per minute (0.21166 mm/s) chart speed. The Barcol hardness value is on the 934-1 scale. The results are reported in Table III.

TABLE III

| Barcol Hardness | 68 |
| Flexural Strength, psi/kPa | 70,772/487,959 |
| Flexural Modulus, psi/kPa | 3,549,000/24,469,645 |

EXAMPLE 4

A. Preparation and B-Staging of a Bisphenol A Dicyanate and p-Isopropenylphenyl Cyanate Solution A 7.96 gram portion of p-isopropenylphenyl cyanate from Example 1A, 42.04 grams of bisphenol A dicyanate prepared using the method of Example 1B and 0.025 gram of cobalt naphthenate (6.0 percent active) were combined to form a mixture. This mixture was heated to 100° C. for 7 minutes (420 s) to provide a B-staged product which was recovered as a transparent, light green colored solution at room temperature (25° C.).

B. Use of B-Staged Bisphenol A Dicyanate and p-Isopropenyl Cyanate Solution in Preparation of a Cured Glass Laminate The 50.0 grams of the B-staged bisphenol A dicyanate and p-isopropenylphenyl cyanate solution from A above and 150 grams of methylene chloride were combined to form a solution. This solution was filtered and then 0.100 gram of cobalt naphthenate (6.0 percent active) was added. A set of three 12-inch by 12-inch (304.8 mm by 304.8 mm) woven fiberglass cloth pieces were then equally impregnated with the solution. The fiberglass cloth used was a commercial-grade product treated with a proprietary coupling agent (Burlington 76-28 electrical laminating cloth) and had an average weight of 0.14 gram per square inch (0.0217 g/cm²). The set of impregnated cloths were allowed to dry for 1 hour (3600 s) at room temperature (25°C.) followed by additional drying in a vented, forced-air, convection-type oven for 10 minutes (600 s) at 70° C. then for 10 minutes (600 s) at 100° C. Each cloth was cooled and found to be tack-free at room temperature and then cut to provide ten 6-inch by 6-inch (152.4 mm by 152.4 mm) pieces which were loaded into a stainless steel frame and placed between stainless steel plates which had been treated with a silicone mold release. The plates were loaded into a 177° C. hot press (Pasadena Hydraulics, Inc., Model P-215) and maintained for two hours (7200 s) at 5000 psi (34.5 MPa). After this time a 6-inch by 6-inch by 1/16-inch (152.4 mm by 152.4 mm by 1.5785 mm) semi-transparent, pale green colored, rigid laminate was recovered and cut to provide a set of seven 1-inch by 2-inch by 1/16-inch (25.4 mm by 50.8 mm by 1.5875 mm) flexural strength test pieces. The flexural strength test pieces were post-cured at 200° C. for two hours (7200 s) and then tested using the method of Example 3C. The results are reported in Table IV.

TABLE IV

| | |
|---|---|
| Barcol Hardness | 73 |
| Flexural Strength, psi/kPa | 102,566/707,172 |
| Flexural Modulus, psi/kPa | 4,250,000/29,302,900 |

COMPARATIVE EXPERIMENT A

Homopolymerization of Bisphenol A Dicyanate

A 161.3 gram portion of bisphenol A dicyanate prepared using the method of Example 1-B was heated to 60° C. to form a solution then 0.16 gram of cobalt naphthenate (6.0 percent active) was added. This solution was poured into a ⅛ inch (0.3175 cm) mold and then placed in an oven and maintained at 125° C. for 2 hours (7200 s) then 177° C. for 2 hours (7200 s). The transparent, light amber colored, clear unfilled casting was demolded and used to prepare test pieces which were tested using the method of Example 1-C. The results are reported in Table V and may be compared directly with those results obtained for Example 1 and Example 2 as reported in Table I and Table II, respectively.

TABLE V

| | |
|---|---|
| Barcol Hardness | 48 |
| Tensile Strength, psi/kPa | 7258/50,042 |
| Elongation % | 1.42 |
| Flexural Strength, psi/kPa | 11,727/80,855 |
| Flexural Modulus, psi/kPa | 660,000/4,550,568 |

COMPARATIVE EXPERIMENT B

Use of Bisphenol A Dicyanate in Preparation of a Cured Glass Laminate

A 55.0 gram portion of Bisphenol A dicyanate prepared using the method of Example 1-B, 150 grams of methylene chloride and 0.125 gram of cobalt naphthenate (6.0 percent active) were combined to form a solution. A set of three 12-inch by 12-inch (304.8 mm by 304.8 mm) woven fiberglass cloth pieces were then equally impregnated with the solution. The fiberglass cloth used was a commercial-grade product treated with a proprietary coupling agent (Burlington 76-28 electrical laminating cloth) and had an average weight of 0.14 gram per square inch (0.0217 g/cm$^2$). The set of impregnated cloths were allowed to dry for 1 hour (3600 s) at room temperature (25° C.) followed by additional drying and B-staging in a vented, forced-air, convection-type oven for 33 minutes (1980 s) at 100° C. then for 5 minutes (300 s) at 125° C. Each cloth was cooled and found to be tack-free at room temperature and then cut to provide ten 6-inch by 6-inch (152.4 mm by 152.4 mm) pieces which were loaded into a stainless steel frame and placed between stainless steel plates which had been treated with a silicone mold release. The plates were loaded into a 177° C. hot press (Pasadena Hydraulics, Inc., Model P-215) and maintained for two hours (7200 s) at 5000 psi (34.5 MPa). After this time a 6-inch by 6-inch by 1/16-inch (152.4 mm by 152.4 mm by 1.5785 mm) green colored, semi-transparent, rigid laminate was recovered and cut to provide a set of seven 1-inch by 2-inch by 1/16-inch (25.4 mm by 50.8 mm by 1.5875 mm) flexural strength test pieces. The flexural strength test pieces were post-cured at 200° C. for two hours (7200 s) and then tested using the method of Example 3-C. The results are reported in Table VI and may be compared directly with those results obtained for Example 3 and Example 4 and reported in Table III and Table IV, respectively.

TABLE VI

| | |
|---|---|
| Barcol Hardness | 69 |
| Flexural Strength, psi/kPa | 86,097/593,622 |
| Flexural Modulus, psi/kPa | 4,075,000/28,096,310 |

EXAMPLE 5

A. Preparation and B-staging of a Bisphenol A Dicyanate and p-Isopropenylphenyl Cyanate Solution A 31.83 gram portion of p-isopropenylphenyl cyanate from Example 1-A, 13.92 grams of bisphenol A dicyanate prepared using the method of Example 1-B and 0.23 gram of cobalt naphthenate (6.0 percent active) were combined to form a mixture. This mixture was heated to 100° C. for 20 minutes (1200 s) to provide a B-staged product which was recovered as a green colored solid at room temperature (25° C.).

B. Preparation and Curing of B-staged Bisphenol A Dicyanate and p-Isopropenylphenyl Cyanate Dissolved in Styrene A 45.7 gram portion of the B-staged bisphenol A dicyanate and p-isopropenylphenyl cyanate from A above and 91.4 grams of styrene were combined and heated with stirring to form a solution. This solution was filtered and then catalyzed with 1.37 grams of benzoyl peroxide. A portion of the catalyzed solution was placed in an oven and maintained at 70° C. for 12 hours (43,200 s), 100° C. for 4 hours (14,400 s), 125° C. for 4 hours (14,400 s), then 150° C. for 4 hours (14,400 s). After this time, a light amber colored, transparent, rigid solid was recovered and a 20.0 milligram sample was analyzed using differential scanning calorimetry (DSC) under a nitrogen atmosphere at a scan rate of 10° C. per minute from 30° C. to 350° C. DSC revealed a sharp glass transition with a midpoint temperature of 133.3° C.

EXAMPLE 6

The following series of mixtures were prepared:

| Designation | p-Isopropenyl phenyl cyanate (grams) | Bisphenol Dicyanate (grams) | Cobalt Naphthenate (6%) (grams) |
|---|---|---|---|
| A | 0.05 | 0.95 | 0.0002 |
| B | 0.10 | 0.90 | 0.0002 |
| C | 0.20 | 0.80 | 0.0002 |
| D | 0.30 | 0.70 | 0.0002 |

The above mixtures A, B, C and D were cured as films on aluminum plates for two hours (7200 s) at 177° C. then two hours (7200 s) at 200° C.

Thermogravimetric analysis (TGA) of a 7.23, 9.20, 11.00, and 10.20 milligram portion of A, B, C and D, respectively was completed. Weight loss was recorded as a function of temperature at a 10° C. per minute rate of increase in a stream of nitrogen flowing at 35 cubic centimeters per minute. The results are reported in Table VII.

Differential scanning calorimetry (DSC) of a 7.30, 6.34, 5.30 and 10.30 milligram portion of A, B, C and D, respectively was completed under a nitrogen atmosphere at a scanning rate of 10° C. per minute from 30° to 450° C. The results are reported in Table VII.

TABLE VII

| Designation | Tg Midpoint (°C.) | Weight Loss (%) | | | | | | |
|---|---|---|---|---|---|---|---|---|
| | | 100° C. | 300° C. | 350° C. | 400° C. | 500° C. | 700° C. | 950° C. |
| A | 207.2 | 0 | 0.2 | 1.9 | 6.7 | 52.2 | 64.2 | 72.2 |
| B | 234.9 | 0 | 0.1 | 2.6 | 2.6 | 47.9 | 59.6 | 61.8 |
| C | 200.6 | 0 | 0 | 0.8 | 2.8 | 47.6 | 59.3 | 61.8 |
| D | 214.3 | 0 | 0 | 0.8 | 2.8 | 47.9 | 59.2 | 61.6 |

EXAMPLE 7

A portion (0.85 gram) of bisphenol A dicyanate prepared using the method of Example 1-B, p-isopropenylphenyl cyanate (0.05 gram) prepared using the method of Example 1-A, bismaleimide of methylenedianiline (0.10 gram) prepared in Example 3-A and 0.0002 gram of cobalt naphthenate (6.0 percent active) were thoroughly mixed and then cured as a film on an aluminum plate for two hours (7200 s) at 177° C. then two hours (7200 s) at 200° C. A portion (11.40 milligrams) of the resulting transparent, amber colored film was anlayzed by DSC and a separate portion (8.18 milligrams) was analyzed by TGA using the method of Example 6. The results are reported in Table VIII.

TABLE VIII

| Tg Midpoint °C. | Weight Loss (%) | | | | | | | |
|---|---|---|---|---|---|---|---|---|
| | 100° C. | 300° C. | 350° C. | 400° C. | 450° C. | 500° C. | 700° C. | 950° C. |
| 173.9 | 0 | 3.4 | 15.7 | 35.7 | 53.3 | 57.0 | 67.2 | 77.8 |

EXAMPLE 8

A portion (0.75 gram) of bisphenol A dicyanate prepared using the method of Example 1-B, p-isopropenylphenyl cyanate (0.05 gram) prepared using the method of Example 1-A, bismaleimide of methylenedianiline (0.20 gram) prepared in Example 3-A and 0.0002 gram of cobalt naphthenate (6.0 percent active) were thoroughly mixed and then cured as a film on an aluminum plate for two hours (7200 s) at 177° C. then two hours (7200 s) at 200° C. A portion (9.50 milligrams) of the resulting amber colored film was analyzed by DSC and a separate portion (10.97 milligrams) was analyzed by TGA using the method of Example 6. The results are reported in Table IX.

TABLE IX

| Tg Midpoint °C. | Weight Loss (%) | | | | | | | |
|---|---|---|---|---|---|---|---|---|
| | 100° C. | 300° C. | 350° C. | 400° C. | 450° C. | 500° C. | 700° C. | 950° C. |
| 165.5 | 0 | 6.8 | 25.8 | 44.6 | 54.7 | 59.0 | 67.7 | 70.8 |

COMPARATIVE EXPERIMENT C

A portion (1.0 gram) of bisphenol A dicyanate prepared using the method of Example 1-B and 0.0002 gram of cobalt naphthenate (6.0 percent active) were thoroughly mixed and then cured as a film on an aluminum plate for two hours (7200 s) at 177° C. then two hours (7200 s) at 200° C. A portion (12.35 milligrams) of the resulting transparent, light amber colored film was analyzed by DSC and a separate portion (6.86 milligrams) was analyzed by TGA using the method of Example 6. The results are reported in Table X and may be compared directly with those results obtained for Example 6 as reported in Table VII.

TABLE X

| Tg Midpoint °C. | Weight Loss (%) | | | | | | | |
|---|---|---|---|---|---|---|---|---|
| | 100° C. | 300° C. | 350° C. | 400° C. | 450° C. | 500° C. | 700° C. | 950° C. |
| 179.3 | 0 | 1.6 | 6.3 | 15.5 | 43.0 | 52.0 | 61.5 | 11.4 |

I claim:
1. A thermosettable composition which comprises
   (A) at least one alkenyl phenyl cyanate containing at least 10 percent by weight of monomeric material represented by formula I

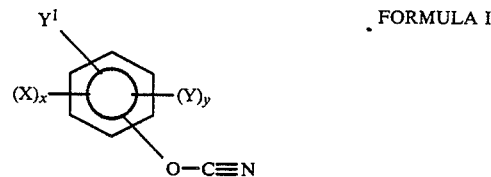

FORMULA I wherein each R, $R^1$ and $R^2$ is independently hydrogen or a hydrocarbyl group having from 1 to about 3 carbon atoms; each X is independently hydrogen, a hydrocarbyl group or a hydrocarbyloxy having from 1 to about 10 carbon atoms, chlorine or bromine; each Y is independently hydrogen or a hydrocarbyl group having from 1 to about 10 carbon atoms; $Y^1$ is a

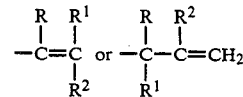

group and x and y are positive integers and the sum of x plus y has a value of 4; and
   (B) at least one of
      (1) at least one aromatic polycyanate,
      (2) at least one polymaleimide, or
      (3) at least one polymerizable ethylenically unsaturated aromatic compound;
wherein component A comprises from about 1 to about 99 percent by weight of the combined weight of components A and B; with the proviso that component (B-3) is not used alone with component (A).

2. A thermosettable composition of claim 1 wherein
   (i) component (A) contains at least about 90 percent by weight of monomeric material represented by formula I;
   (ii) component (B-1) is represented by the following formulas IIIA, IIIB, IIIC, IIID or any combination thereof

FORMULA IIIA

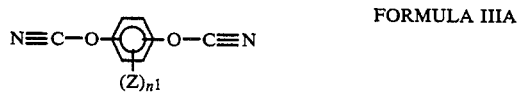

FORMULA IIIB

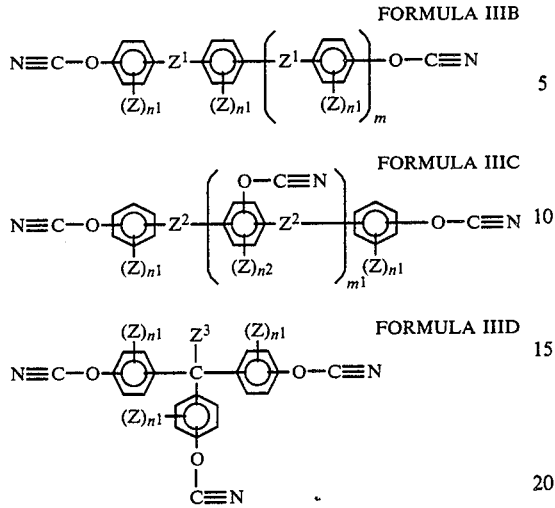

FORMULA IIIC

FORMULA IIID wherein each Z is independently hydrogen, a hydrocarbyl or hydrocarbyloxy group having from 1 to about 10 carbon atoms, chlorine, bromine, or a —O—C≡N group; $Z^1$ is independently a direct bond, an alkylene group having from 1 to about 5 carbon atoms, —S—, —S—S—,

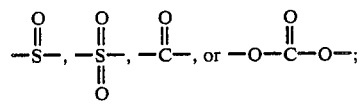

$Z^2$ is independently a divalent hydrocarbon group having from 1 to about 6, carbon atoms or a

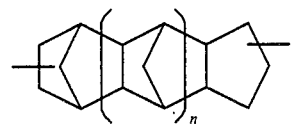

group; $Z^3$ is a hydrogen, a hydrocarbyl or hydrocarbyloxy group having from 1 to about 10 carbon atoms, chlorine or bromine; m has a value of zero to about 100, $m^1$ has a value of from about 0.001 to about 6; n has a value of from zero to about 10; $n^1$ has a value of 4 and $n^2$ has a value of 3;

(iii) component (B-2) is represented by formulas V, VI, VII or any combination thereof

FORMULA V

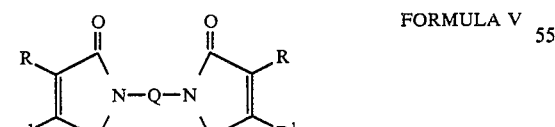

FORMULA VI

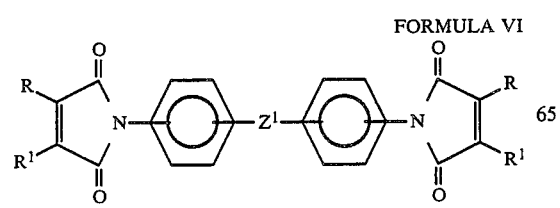

FORMULA VII

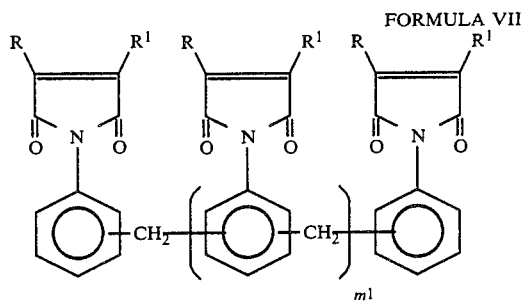

wherein R, $R^1$ and $Z^1$ are as above; Q is a divalent alkyl radical having 2 to about 12 carbon atoms and $m^1$ has a value of 0.01 to about 10;

(iv) component (B-3) is represented by the following formula XII

FORMULA XII

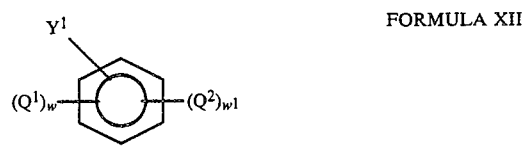

wherein R, $R^1$, $R^2$ and $Y^1$ are as above defined, each $Q^1$ is independently hydrogen, a hydrocarbyl group or hydrocarbyloxy group having from 1 to about 10 carbon atoms, a vinyl group, an allyl group, chlorine or bromine; each $Q^2$ is independently hydrogen or a hydrocarbyl or hydrocarbyloxy group having from 1 to about 4 carbon atoms and w and $w^1$ are each positive integers, the sum of which is 5;

(v) component (A) comprises from about 1 to about 75 percent by weight of the combined weight of components A and B.

3. A thermosettable composition of claim 2 wherein component A comprises from about 5 to about 50 percent by weight of the combined weight of components A and B.

4. A thermosettable composition of claim 3 wherein
(i) component A is selected from p-isopropenylphenyl cyanate, p-vinyl phenyl cyanate, m-vinyl phenyl cyanate, methyl-p-isopropenylphenyl cyanate, 3-chloro-4-isopropenylphenyl cyanate, p-allylphenyl cyanate, p-methallylphenyl cyanate, m-allylphenyl cyanate, 2,6-dimethyl-4-allylphenyl cyanate, or mixtures thereof;
(ii) component (B-1) is selected from bisphenol A dicyanate, the dicyanates of 4,4'-dihydroxydiphenyl oxide, resorcinol, 4,4'-thiodiphenol, 4,4'-sulfonyldiphenol, 3,3',5,5'-tetrabromobisphenol A, 2,2',6,6'-tetrabromobisphenol A, 3-phenylbisphenol A, 4,4'-dihydroxybiphenyl, 2,2'-dihydroxybiphenyl, 2,2',4,4'-tetrahydroxydiphenyl methane, 2,2',6,6'-tetramethyl-3,3',5,5'-tetrabromobisphenol A, 3,3'-dimethoxybisphenol A,

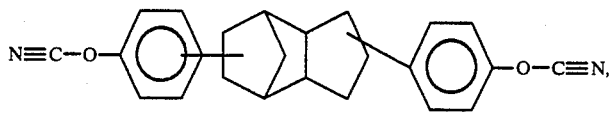

the tricyanate of tris (hydroxyphenyl) methane, the polycyanate of a phenolformaldehyde condensation product (novolac), the polycyanate of a dicyclopentadiene and phenol condensation product, or mixtures thereof;

(iii) component (B-2) is selected from N,N'-ethylenebismaleimide, N,N'-ethylenebis(2-methylmaleimide), N,N'-hexamethylenemaleimide, N,N'-(oxydi-p-phenylene)bismaleimide, N,N'-(methylenedi-p-phenylene)bismaleimide, N,N'-(methylenedi-p-phenylene)bis(2-methylmaleimide), N,N'-(thiodi-p-phenylene)bismaleimide, N,N'-(sulfonyldi-m-phenylene)bismaleimide, N,N'-(isopropylidenedi-p-phenylene)bismaleimide, polymethylene polyphenylene polymaleimides, or mixtures thereof;

(iv) component (B-3) is selected from styrene, alpha-methylstyrene, chlorostyrene, bromostyrene, t-butylstyrene, p-methylstyrene, p-methoxystyrene, divinylbenzene, propylstyrene, chloro-alpha-methylstyrene, m-methylstyrene, o-methylstyrene, allylbenzene, methallylbenzene, p-allylstyrene, divinylbenzene, or mixtures thereof.

5. A thermosettable composition of claim 1 wherein
(i) component (A) is p-isopropenyl phenyl cyanate;
(ii) component (B) consists of a mixture of components (B-1), (B-2) and (B-3);
(iii) component (B-1) is bisphenol A dicyanate;
(iv) component (B-2) is the bismaleimide of methylene dianiline; and
(v) component (B-3) is styrene.

6. A thermosettable composition of claim 2 wherein
(i) component (A) is p-isopropenyl phenyl cyanate;
(ii) component (B) consists of a mixture of components (B-1), (B-2) and (B-3);
(iii) component (B-1) is bisphenol A dicyanate;
(iv) component (B-2) is the bismaleimide of methylene dianiline; and
(v) component (B-3) is styrene.

7. A thermosettable composition of claim 3 wherein
(i) component (A) is p-isopropenyl phenyl cyanate;
(ii) component (B) consists of a mixture of components (B-1), (B-2) and (B-3);
(iii) component (B-1) is bisphenol A dicyanate;
(iv) component (B-2) is the bismaleimide of methylene dianiline; and
(v) component (B-3) is styrene.

8. A thermosettable composition of claim 1 wherein
(i) component (A) is p-isopropenyl cyanate;
(ii) component (B) consists of component (B-1);
(iii) component (B-1) is bisphenol A cyanate.

9. A thermosettable composition of claim 2 wherein
(i) component (A) is p-isopropenyl cyanate;
(ii) component (B) consists of component (B-1);
(iii) component (B-1) is bisphenol A cyanate.

10. A thermosettable composition of claim 3 wherein
(i) component (A) is p-isopropenyl cyanate;
(ii) component (B) consists of component (B-1);
(iii) component (B-1) is bisphenol A cyanate.

11. A thermosettable composition of claim 1 wherein
(i) component (A) is p-isopropenyl phenyl cyanate;
(ii) component (B) consists of a mixture of components (B-1) and (B-3);
(iii) component (B-1) is bisphenol A dicyanate; and
(iv) component (B-3) is styrene.

12. A thermosettable composition of claim 2 wherein
(i) component (A) is p-isopropenyl phenyl cyanate;
(ii) component (B) consists of a mixture of components (B-1) and (B-3);
(iii) component (B-1) is bisphenol A dicyanate; and
(iv) component (B-3) is styrene.

13. A thermosettable composition of claim 3 wherein
(i) component (A) is p-isopropenyl phenyl cyanate;
(ii) component (B) consists of a mixture of components (B-1) and (B-3);
(iii) component (B-1) is bisphenol A dicyanate; and
(iv) component (B-3) is styrene.

14. A thermosettable composition of claim 1 wherein
(i) component (A) is p-isopropenyl phenyl isocyanate;
(ii) component (B) consists of a mixture of components (B-1) and (B-2);
(iii) component (B-1) is bisphenol A dicyanate; and
(iv) component (B-2) is the bismaleimide of methylene dianiline.

15. A thermosettable composition of claim 2 wherein
(i) component (A) is p-isopropenyl phenyl isocyanate;
(ii) component (B) consists of a mixture of components (B-1) and (B-2);
(iii) component (B-1) is bisphenol A dicyanate; and
(iv) component (B-2) is the bismaleimide of methylene dianiline.

16. A thermosettable composition of claim 3 wherein
(i) component (A) is p-isopropenyl phenyl isocyanate;
(ii) component (B) consists of a mixture of components (B-1) and (B-2);
(iii) component (B-1) is bisphenol A dicyanate; and
(iv) component (B-2) is the bismaleimide of methylene dianiline.

* * * * *